United States Patent [19]
Kraus

[11] Patent Number: 5,448,809
[45] Date of Patent: Sep. 12, 1995

[54] HOLDING ELEMENT MADE OF PLASTIC

[75] Inventor: Willibald Kraus, Grunstadt, Germany

[73] Assignee: TRW United Carr GmbH & Co. KG, Enkenbach-Alsenborn, Germany

[21] Appl. No.: 206,976

[22] Filed: Mar. 7, 1994

[30] Foreign Application Priority Data

Mar. 9, 1993 [DE] Germany .................. 43 07 434.0

[51] Int. Cl.⁶ ........................................ F16B 19/00
[52] U.S. Cl. .................................. 24/453; 24/297; 411/510; 411/913
[58] Field of Search .................... 24/453, 297; 411/508–510, 913; 248/74.3; 174/138 D

[56] References Cited

U.S. PATENT DOCUMENTS

| | | |
|---|---|---|
| 2,424,757 | 7/1947 | Klumpp, Jr. . |
| 2,836,215 | 5/1958 | Rapata . |
| 3,079,581 | 2/1963 | Klumpp, Jr. . |
| 3,393,431 | 7/1968 | Saunders . |
| 3,493,918 | 2/1970 | Van Niel . |
| 4,488,206 | 12/1984 | Mizusawa ................... 24/297 X |
| 4,704,059 | 11/1987 | Nakama et al. ............... 411/510 X |
| 4,762,437 | 8/1988 | Mitomi ....................... 24/297 X |
| 4,787,795 | 11/1988 | Kraus . |
| 4,902,182 | 2/1990 | Lewis . |
| 4,927,306 | 5/1990 | Sato .......................... 411/510 X |
| 5,011,356 | 4/1991 | Fernandez ................... 24/297 X |
| 5,039,040 | 8/1991 | Idjakiren .................... 24/297 X |
| 5,046,223 | 9/1991 | Kraus ......................... 24/297 X |
| 5,084,944 | 2/1992 | Hileman ...................... 24/297 X |

*Primary Examiner*—James R. Brittain
*Attorney, Agent, or Firm*—Fay, Sharpe, Beall, Fagan, Minnich & McKee

[57] ABSTRACT

A holding element 1 is formed of plastic with a basic body 2 and an adjoining resilient stop 3. There are formed onto the basic body several resilient detents 4, 4'; 5, 5', located in diagonally oppositely disposed pairs with front engagement surfaces 6, 6'; 7, 7' facing the resilient stop 3. The basic body is rectangular in cross section and exhibits an open interior S. Moreover, all four side surfaces are equipped with at least one of the resilient detents 4, 4'; 5, 5'. At least two of the diagonally opposite detents respectively have a T-shape, and the transverse cross-piece 9 on the T-shape carries the front engagement surface. The vertical cross-piece 10 of the T-shape is arranged between two recesses 11, 12 located in the plane of the side surfaces of the basic body 2. Each detent 4, 4'; 5, 5' is surrounded by perforations 13 extending to the free interior space 8 in the basic body 2.

11 Claims, 2 Drawing Sheets

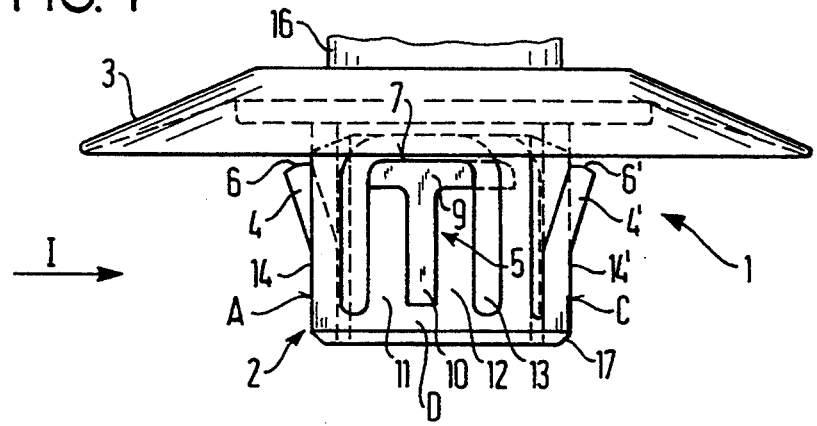
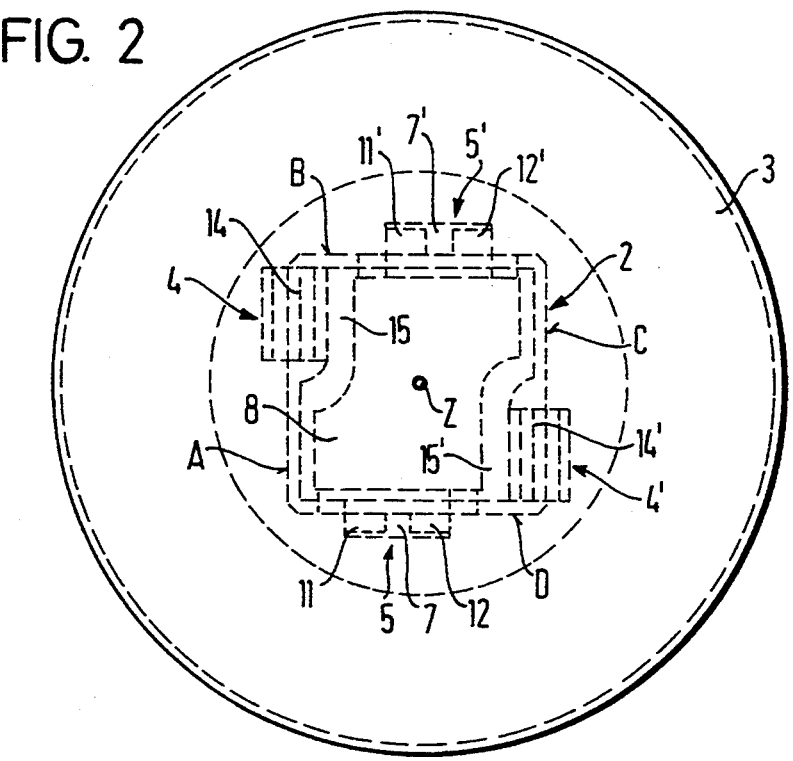
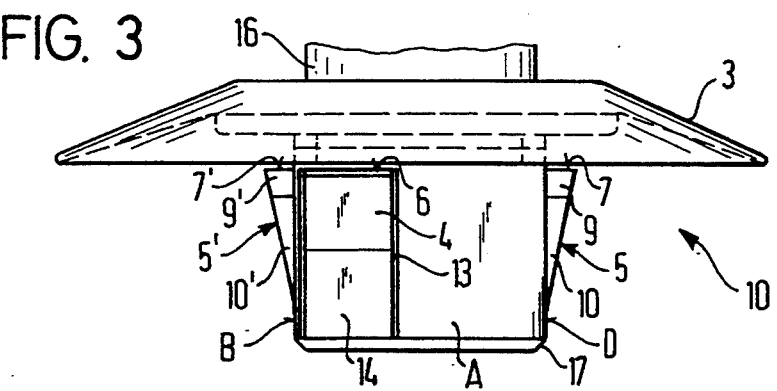

HOLDING ELEMENT MADE OF PLASTIC

BACKGROUND OF THE INVENTION

The subject invention is directed to a holding element formed of plastic and having a basic body and an adjoining resilient stop or spring retainer. Formed onto the basic body are several resilient detents mounted in opposed pairs oriented with their front surfaces facing the spring retainer.

A similar holding element is already known as state of the art (German Petty Patent 8,113,637). In this known design, the basic body has the shape of a cylinder and there are diagonally opposite pairs of resilient tongues with front surfaces in the same plane. Between the pairs of tongues there is arranged at the circumference of the basic body another pair of resilient tongues, the frontal surfaces of which are positioned in another plane vis-a-vis the underside of the spring retainer. This construction is built in such manner that the result is an expensive fabrication.

The state of the art further includes a holding element whose basic body is also cylindrical in cross section and has two diagonally opposing detents formed thereon (see U.S. Pat. No. 3,393,431). With this known construction, there may result the drawback or disadvantage that with a rotation of 90° around the longitudinal axis firm seating and proper engagement is no longer guaranteed.

Likewise, identical drawbacks and disadvantages are attached to another construction where two opposite detents are equipped with different or stepped gradations (see U.S. Pat. Nos. 2,424,757; 3,079,581; and, 3,493,918).

Additionally, a holding element is known that has a basic body of rectangular form (see U.S. Pat. No. 2,836,215). In this known construction, only two opposing detents are provided. By placing a screw into a central opening, the detents spread apart and position themselves behind the areas of a support. Thus, with this known construction, a tightening element, namely a screw, is required in order to facilitate fastening to a support.

SUMMARY OF THE INVENTION

The present invention has the task and primary object of creating a holding element of the initially-mentioned type which, even with 90° rotation around its longitudinal axis, guarantees excellent, secure seating within a support. Additionally, with the design of the invention, there is to be guaranteed a technically readily realizable and cost-efficient fabrication.

According to the invention, this task is solved in that the basic body is designed with a rectangular cross section and exhibits in the interior a free, open space. The basic body is equipped on all four sides surfaces with resilient detents located in diagonally opposite pairs. At least two of the diagonally opposite detents respectively exhibit a T-shape with the transverse cross-piece of the T-shape forming a front engagement surface and the vertical cross-piece of the T-shape arranged between two recesses positioned in the plane of the side surfaces of the basic body. Each detent is surrounded by perforations extending through to the free, open space in the interior of the basic body.

This design results in the advantage that the basic body is kind of a centering cage, which guarantees, even with random rotation around its longitudinal axis, a precise centering in the support opening. Any undesired down-tilting is definitely avoided regardless of whether the opening in the support is shaped as a cylindrical bore, a long slot-like hole, or as rectangular opening. Because of the specific design there results, moreover, (from a technical tooling perspective) an easily realizable, cost-saving fabrication.

The basic body may also be oval in shape or exhibit another form. In each instance, however, there must exist a centering cage in order to produce the desired function.

BRIEF DESCRIPTION OF THE DRAWINGS

The above and other objects and advantages of the invention will become apparent from the following description when read in conjunction with the accompanying drawings wherein:

FIG. 1 is a side view of a holding element formed in accordance with a preferred embodiment of the invention;

FIG. 2 is a top plan view of the holding element of FIG. 1;

FIG. 3 is a view taken on line III—III of FIG. 1;

DETAILED DESCRIPTION OF THE PREFERRED AND ALTERNATE EMBODIMENTS

Figure 4:
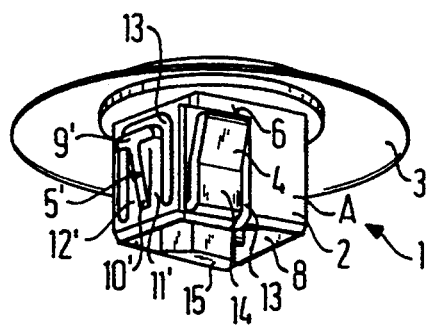
FIGS. 4 and 5 are bottom perspective views of the holding element according to the invention, respectively rotated approximately 90° around the longitudinal axis.

Referring more particularly to the drawings wherein the showings are for the purpose of illustrating preferred embodiments only and not for the purpose of limiting same, FIG. 1 illustrates the preferred form of the holding element as comprised of plastic and including, essentially, a basic main body 2 and an adjoining resilient stop in the form of, for example, a circumferential and radially extending resilient spring retainer 3. The spring retainer can be round, according to FIG. 2, but the possibility also exists to design the same in oval or angular form or in some other configuration.

The basic body has a square design in cross section and, as shown in FIG. 2, has four side surfaces A, B, C, and D. These four side surfaces are respectively fitted with diagonally opposite pairs of resilient detents, 4, 4' and 5, 5'.

As can be noted, the detents 5 and 5' are positioned in side surfaces B and D and protrude slightly therefrom. In frontal view, the detents 5 and 5' have the shape of a "T".

It is apparent from FIG. 1 that the transverse cross-piece 9 of the T-shaped detent 5 has the front surface 7, while the vertical cross-piece be is arranged between two recesses 11 and 12, positioned in the plane of side surface D of the basic body 2.

Correspondingly, detent 5' also exhibits a T-shape, with a transverse cross-piece 9' and a vertical cross-piece 10' which, in turn, is arranged between two recesses 11' and 12' positioned in the plane of side surface A (see FIG. 2).

Additionally, it is apparent from FIG. 2 that the basic body 2 exhibits in the interior thereof a free, open working space. The space 8 extends up to the height of the underside of the spring retainer 3 but can also be interrupted by at least one cross-piece.

Out of sides A or C there are, again, two diagonally opposite detents formed outwardly, which, according to FIG. 3 exhibit a rectangular shape in frontal view. The end region 14 or 14' of these rectangular detents 4, 4' is, vis-a-vis the side surface A or C of the basic body, pulled into the space 8 so that, according to FIG. 2, the free, open working space 8 exhibits two diagonally opposite, pulled-in thicker regions 15 and 15'.

Figure 5:
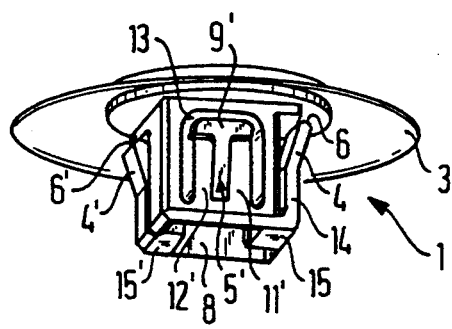

It is apparent from FIGS. 4 and 5 that the T-shaped detents 5' protrude both with the vertical cross-piece 10' as well as with the transverse cross-piece 9' from the plane of the interpositioned recesses 11, 12. In contrast thereto, the diagonally opposite detents 4 and 4' are designed in such manner that their respective end region 14 is positioned at the level of their assigned side surfaces and that the detents 4, 4' are angled off only at approximately the middle. Their front surfaces 6, 6' thus protrude from the side surfaces A and C, assigned to them. In accordance with this construction according to FIG. 2, the aforementioned pulled-in regions 15 or 15' are present in the basic body 2.

Each of the detents 4, 4' or 5, 5' or their recesses 11 and 12; 11' and 12' is surrounded by a perforation which extends up to the "free working" 8 of the basic body 2. Thus, the detents 4, 4' or 5, 5' have an excellent resilient effect, so that the corresponding front surfaces 6 and 6' or 7 and 7' of the aforementioned detents position themselves at the underside of a not indicated support, whereas the opposite side of said support is acted upon by the circumferential edge of the resilient part 3.

The basic body 2 with quadratically designed cross section having specifically formed detents 4 and 4' and 5 and 5' thus forms collectively a centering cage. Precise centering in a support opening is thereby attained, regardless of whether the opening is designed as a circular bore, a long hole, or a rectangular hole. Undesired down-tilting around the central axis Z according to FIG. 2 is not possible.

It is apparent from FIG. 3 that the front surfaces 6, 6' and 7, 7' of the respective detents face the underside of the spring retainer 3 and are located in the same horizontal plane.

In an unillustrated form of the invention, the possibility also exists that these front surfaces 6, 6' and 7, 7' of the respective detents can be located in at least two different horizontal planes, so that the holding element 1 according to the invention can also be inserted in supports with varying thickness and be efficiently secured therein.

Above the spring retainer there may be located, according to FIGS. 1 or 3, a connecting region 16 for a not specifically identified storage, holding, or engagement element, for instance a cable tape for mounting of pipes, a clip region, or an engagement (device) for storage of a not more specifically identified part.

In order to simplify the mounting of the basic body 2 in a support opening, the basic body 2 exhibits frontally an insertion flange or chamfer 17 according to FIGS. 1 and 3.

While in the illustrated embodiment the basic body 2 exhibits a rectangular form, there also exists the possibility of forming the same in oval or some other configuration. In each instance, however, it must definitely be ascertained that there will result a centering cage with opposing detents.

Figure 6:
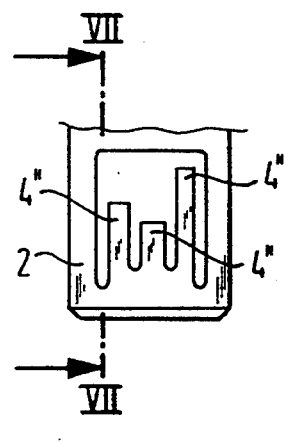
FIG. 6 partial frontal view of another embodiment.
Figure 7:
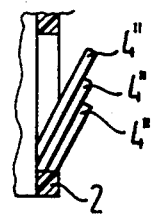
FIG. 7 is a cross section accordingly to line VII—VII in FIG. 6.

According to FIGS. 6 and 7, detents 4" may also be present at different heights in the side surfaces of the basic body 2, whereby attachment of the holding element is possible even with different support thicknesses.

Because of the specific design, a holding element of plastic is created which guarantees, even with random rotation around its central axis Z, excellent fixed seating and excellent centering in a support opening. Undesirable down-tilting is avoided. In addition, the entire unit is conceived in such manner that a mechanically sound and cost-effective fabrication is obtained.

The invention has been described with reference to the preferred embodiment. Obviously, modifications and alterations will occur to others upon a reading and understanding of this specification. It is intended to include all such modifications and alterations insofar as they come within the scope of the appended claims or the equivalents thereof.

Having thus described the invention, it is claimed:

1. A holding element formed of plastic comprising a main body having at least one radially extending resilient stop and a plurality of diagonally opposite pairs of resilient detents oriented with front engagement surfaces facing toward the stop, the improvement wherein the body (2) is rectangular in the cross section with an open interior, the main body (2) having four side surfaces (A, B, C, D) each carrying one of the diagonally opposite, resilient detents (4, 4'; 5, 5');

at least two of the diagonally opposite detents (5, 5') respectively exhibit a T-shape with a transverse cross-piece (9, 9') that has a front engagement surface (7, 7') and a vertical cross-piece (10, 10'), the vertical cross-piece (10, 10') being arranged between two recess (11, 12; 11', 12') positioned in the plane of the side surfaces (A, B, C, D) of the main body (2); and, each detent (4, 4'; 5, 5') surrounded in the main body (2) by perforations (13) extending through to the open interior (8).

2. A holding element according to claim 1 wherein the resilient stop is designed as circumferential spring flange (3).

3. A holding element according to claim 1 wherein the main body (2) is square in cross section.

4. A holding element according to claim 1 wherein there are formed onto two opposite side surfaces (A, C) of the main body (2), rectangular detents (4, 4'), and the two T-shaped detents (5, 5') are in the other side surfaces.

5. A holding element according to claim 4 wherein an end region (14, 14') of the rectangular detents (4, 4') includes a thickened portion extending into the open interior on diagonally opposite sides.

6. A holding element according to claim 1 wherein the front engagement surfaces (6, 6'; 7, 7') of the detents (4, 4'; 5, 5') are engagement located in the same horizontal plane.

7. A holding element according to claim 1 wherein the front surfaces (6, 6'; 7, 7') of the detents (4, 4'; 5, 5') are positioned in at least two different horizontal planes.

8. A holding element according to claim 1 wherein above the resilient stop (3) there is arranged a connection region (16) for joining to a storage, holding, or engagement element.

9. A holding element according to claim 1 wherein the main body (2) has a slanted portion (17) at its forward end.

10. A holding element formed of plastic having a body and at least one adjoining stop member wherein there are formed onto the body several resilient detents having front stop surfaces facing toward the stop member, the improvement wherein the body has an open interior and is equipped at opposite sides with resilient detents with at least two diagonally opposite detents having a T-shape with a transverse cross-piece having the front stop surface and a vertical cross-piece arranged between recesses positioned in the plane of a side surface of the basic body; and each detent being surrounded by perforations extending to the open interior in the basic body.

11. In a fastening element formed of plastic and comprising a basic body with at least one adjoining stop member and resilient detents formed onto the basic body on diagonally opposite sides with front stop surfaces on the detents facing toward the stop member, the improvement wherein the basic body has a free open hollow interior and the diagonally opposite resilient detents are arranged in groups with there being at least three detents of different heights in each group and with each detent in each group being surrounded by perforations extending to the open interior of the basic body.

* * * * *